United States Patent [19]

Yoshida

[11] Patent Number: 5,006,169

[45] Date of Patent: Apr. 9, 1991

[54] LIPOPHOBICATING SOLUTION FOR ELECTROPHOTOGRAPHIC PLATES FOR OFFSET PRINTING

[75] Inventor: Hajime Yoshida, Nagoya, Japan.

[73] Assignee: Nikken Chemical Laboratory Co., Ltd., Nagoya, Japan

[21] Appl. No.: 536,495

[22] Filed: Jun. 11, 1990

Related U.S. Application Data

[62] Division of Ser. No. 268,948, Nov. 8, 1988, Pat. No. 4,954,173.

[30] Foreign Application Priority Data

Nov. 19, 1987 [JP] Japan ................................ 62-292630

[51] Int. Cl.$^5$ ........................... C09K 3/00; B41M 5/25

[52] U.S. Cl. ........................................ 106/2; 101/465

[58] Field of Search .................... 106/2; 101/423, 465; 558/71

[56] References Cited

U.S. PATENT DOCUMENTS

| | | |
|---|---|---|
| 3,016,398 | 1/1962 | Larson et al. . |
| 4,579,591 | 4/1986 | Suzuki et al. . |

*Primary Examiner*—William R. Dixon, Jr.
*Assistant Examiner*—Melissa Bonner
*Attorney, Agent, or Firm*—Spencer & Frank

[57] ABSTRACT

A lipophobicating solution for an electrophotographic plate for offset printing is disclosed which comprises (a) phytic acid, (b) a diamine having the general formula $NH_2$—R—$NH_2$ wherein R is an alkyl or aryl group having from 2 to 8 carbon atoms, and (c) water. The pH of the solution is in the range from about 3.0 to about 6.0. This lipophobicating solution does not cause scumming and allows an electrophotographic process to produce clean printed sheets.

11 Claims, No Drawings

LIPOPHOBICATING SOLUTION FOR ELECTROPHOTOGRAPHIC PLATES FOR OFFSET PRINTING

CROSS-REFERENCE TO RELATED APPLICATIONS

This is a divisional application of application No. 07/268,948 filed Nov. 8, 1988, now U.S. Pat. No. 4,954,173 patented Sept. 4, 1990, of which is incorporated herein by reference; and is related to U.S. Pat. No. 4,734,132 and Japanese Patent Application No. SHO 62-292630 filed Nov. 19, 1987, which are also incorporated herein by reference.

FIELD OF THE INVENTION

The present invention relates to a lipophobicating solution for electrophotographic plates for offset printing. More particularly, it relates to an improvement of a lipophobicating solution containing phytic acid. This lipophobicating solution is applied to a plate material (referred to as master paper hereinafter) produced by coating the surface of a support (e.g., paper) with zinc oxide to form the lipophilic image areas by electrophotography on a plate for offset printing.

TECHNOLOGY REVIEW

Among the lipophobicating solutions for electrophotographic plates for offset printing, those based on phytic acid are preferred to those based on ferrocyan ion because the former causes no harm, permits the use of cyanin blue-based ink, and facilitates pH adjustment. However, it is known that a lipophobicating solution prepared simply by diluting phytic acid is not of practical value because it soon causes scumming on master paper (as shown in Comparative Experiment 1 given later). To eliminate this disadvantage, various lipophobicating solutions have been proposed. One example is composed of phytic acid, a complex or salt of an aminocarboxylic acid, and a polyhydroxy-carboxylic acid. Another example is composed of a metal salt of phytic acid, a water-soluble fluoride, an alkali metal salt of dicarboxylic acid, and an alkali metal salt of phosphoric acid. It is said that these lipophobicating solutions provide master paper capable of thousands to ten thousands impressions without scumming.

Lipophobicating solutions prepared according to the formulations given above were examined for their effect. It was found that the master paper treated with them causes slight scumming even at the beginning of printing. These results suggest that the conventional lipophobicating solutions have a disadvantage in practical use.

The Applicant in U.S. Pat. No. 4,734,132 disclosed a lipophobicating solution which is formed of at least two dicarboxylic acids, water, phytic acid and a pH adjuster. This solution was found to be effective without entailing the phenomenon of scumming. The disclosure of U.S. Pat. No. 4,734,132 is hereby incorporated into this disclosure.

SUMMARY OF THE INVENTION

An object of this invention is to provide an alternative lipophobicating solution containing phytic acid which will not produce scumming and which is highly advantageous to use.

Another object of the present invention is to provide a lipophobiating solution containing a diamine, possessing two coordinating nitrogen atoms, as an additive which is inexpensive and readily available.

It is another object of the present invention to provide a lipophobicating solution which can be easily prepared from phytic acid and a diamine possessing two coordinating nitrogen atoms effective in a wide range of mixing ratios.

These and other objects are achieved by the present invention, which provides a lipophobicating solution for an offset printing electrophotographic plate using phytic acid as a chelating agent, wherein the lipophobicating solution further contains at least one diamine possessing two coordinating nitrogen atoms.

DETAILED DESCRIPTION OF THE INVENTION

The following ar detailed descriptions of the constituents of the lipophobicating solution of this invention.

(a) Phytic acid (also called inositol hexaphosphate) makes the nonimage areas lipophobic, preventing the sticking of oily ink. This is due to the hydroxyl groups of phytic acid at the 2- and 6-positions or at the 3- and 5-positions that form a chelate compound with zinc on the nonimage areas formed on the master paper by electrophotography. Phytic acid occurs in nature in the seeds of many cereal grains, and it is nontoxic. The amount of phytic acid to be added is not less than 3%, preferably not less than 5%, by weight of the lipophobicating solution produced.

(b) The diamine possessing two coordinating nitrogen atoms is represented by the general formula NH2-R-NH2 wherein R is an alkyl or aryl group having from 2 to 8 carbon atoms. Suitable amines for practicing the invention include ethylenediamine, propylenediamine ($R=-CH_2-CH(CH_3)-$), trimethylenediamine, paraphenylenediamine, and hexamethylenediamine. The invention can be practiced with a solution containing one or more of these diamines.

These diamines should be basic and therefore capable of forming salts with phytic acid.

A lipophobicating solution containing at least one diamine according to the invention prevents production of smearing caused by scumming on printed sheets as demonstrated in working examples cited later herein. It is theorized that the diamine salt of phytic acid in the solution is ionically dissociated, and when the phytic acid is allowed to react with zinc to form an insoluble chelate, the diamine is then in a free state and reacts with zinc to form an insoluble chelate, and these reactions proceed smoothly without impairing the balance between the phytic acid and the diamine. This invention is, of course, not limited by this or an other theory.

Use of a monoamine has failed to yield any desirable result as demonstrated in Comparative Experiments 4 and 5. The use of a monoamine necessitates incorporation of other additives such as a water-soluble cation polymer as disclosed in Japanese Patent Application Disclosure SHO 60(1985)-23,099.

The amount of the diamine to be added should be such as to adjust the pH value of the lipophobicating solution in the range of about 3.0 to 6.0, preferably to about 4.0, on the condition that a pH adjusting agent such as sodium hydroxide is absent. In the case of ethylenediamine, for example, this amount is in the range of about 2.86 to 4.36 times, preferably about 1.31 times, the amount of phytic acid by mole (Example 1).

To prevent smearing of printed sheets by scumming the pH value of the lipophobicating solution should be maintained in the range of about 3.0 to 6.0.

A lipophobicating solution of outstanding performance is obtained according to the present invention when only a diamine is used for the adjustment of the pH of the lipophobicating solution in the range of about 3.0 to 6.0 as demonstrated in Examples 1 to 7.

Optionally, incorporation of other pH adjusting agents such as sodium hydroxide in the lipophobicating solution is permissible as demonstrated in Examples 8 to 11. In this case, the performance of the lipophobicating solution is continuously improved as the proportion of diamine in the solution increases. Preferably the diamines of the invention are present in the lipophobicating solution in an amount sufficient to cause at least about 20 percent by weight of the pH adjusting agent required for the adjustment of the pH value of the lipophobicating solution to the prescribed level (Comparative Experiments 1 to 6). In Comparative Experiment 1, for example, the amount of sodium hydroxide is limited to below $(16.41 \times 0.80) = 13.13$ g.

The amount of diamine to be added according to the invention has been described above with reference to ethylenediamine taken as an example. When propylenediamine or other diamines are used either singly or in the form of a mixture of two or more members or when ethylenediamine is used in combination with such other diamines, the amount of diamine to be added should be corrected by reference to the dissociation constant of the relevant diamine salt of phytic acid.

(c) Additives

The lipophobicating solution of this invention may contain the following additives [(c- 1)-(c-7)] according to need:

(c-1) Pastes (for visocosity improvement) such as starch (including soluble starch and dextrin) and derivatives thereof, cellulose derivatives, sodium polyacrylate, gum arabic, and pullulan which are in common use;

(c-2) Wetting (Moisture agents) agents such as ethylene glycol, propylene glycol, diethylene glycol, polyethylene glycol, polypropylene glycol, glycerin, sorbitol, glucose, and sugar;

(c-3) Inorganic acids and salts thereof such as phosphoric acid, metaphosphoric acid, nitric acid, silicic acid, and metasilicic acid, and organic acids and salts thereof such as citric acid and tannic acid which are commonly used in printing;

(c-4) Preservatives (antiseptics) such as salicylic acid, benzoic acid, and dehydroacetic acid;

(c-5) Auxiliaries (auxiliary agents) such as aromatic (for example benzene, toluene) sulfonic acid and salts thereof;

(c-6) Surface tension adjusting agents such as lower alcohols, ethers, ketones, and cellosolves; and (c-7) coloring dyes.

(d) Optionally, additional chelating agents, such as the combination of at least about 60 mol%, based on phytic acid, of a mixture of two or more dicarboxylic acids selected from the group of dicarboxylic acids represented by the formula $HOOC-(CH_2)_n-COOH$ (wherein n stands for an integer in the range of 1 to 6), or phthalic acid. When these additives are used, the resultant lipophobicating solution manifests a better performance (as evinced by a visually discernible improvement) than when these additives are not used.

The present invention can also of course, be used to advantage without additional chelating agents.

The amount of the diamine to be added if additional chelating agents are used is likewise such as to adjust the pH value of the produced lipophobicating solution to a value in the range of from about 3.0 to 6.0.

EXAMPLES

The present invention will be described more specifically below with reference to working examples.

Lipophobicating solutions of Examples 1 to 20 were prepared in the varying compositions shown in Table 1 to 3. Further, lipophobicating solutions of Examples 21 to 34 were prepared in the varying compositions shown in Table 4. Separately, lipophobicating solutions of Comparative Experiments 1 to 6 were prepared in the varying compositions shown in Table 5. The phytic acid (50%) indicated in the tables was a product of Mitsui-Toatsu Chemicals, Inc.

Each of the lipophobicating solutions was applied on a master paper produced in advance for printing. Separately, the same solution was diluted with water to 20 times the original volume, to produce a print-immersing water.

The master paper was set in a ordinary offset printing machine (produced by Tyobi K.K. and marketed under product code of "2800CD"). The printing machine was operated to print sheets of neutral paper having an ash content of 20 percent (produced by Hokuetsu Paper Mills, Ltd.) with an indigo ink (produced by Nikken Kagaku Kenkyusho K.K. and marketed under trademark designation of "Master Blue").

The printed sheets were visually examined (with the aid of a magnifying glass in Examples 10, 19, and 20) as to the presence or absence of signs of scumming.

The results are shown in the tables.

It is clearly noted from the results that the lipophobication solutions of the working examples were amply fit for actual use.

The invention now being fully described, it will be apparent to one of ordinary skill in the art that man changes and modifications can be made thereto without departing from the spirit or scope of the invention as set forth herein.

The present disclosure relates to the subject matter disclosed in Japanese Patent Application SHO 62-292630 of Nov. 19th, 1987, the entire specification of which is incorporated herein by reference.

TABLE 1

| Components | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Water | 885.90 | 882.15 | 882.20 | 862.15 | 883.60 | 883.70 | 876.85 | 878.45 | 878.70 | 884.20 | 870.50 |
| Phytic acid (50%) | 100.00 | 100.00 | 100.00 | 100.00 | 100.00 | 100.00 | 100.00 | 100.00 | 100.00 | 100.00 | 100.00 |
| Ethylene-diamine | 14.10 | — | — | — | 7.65 | 7.55 | 10.40 | 7.30 | 7.05 | 10.00 | — |
| Propylene-diamine | — | 17.85 | — | — | 8.75 | — | — | 5.80 | — | — | — |

TABLE 1-continued

| Components | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Trimethyl-enediamine | — | — | 17.80 | — | — | 8.75 | — | — | 5.80 | — | — |
| Paraphenyl-enediamine | — | — | — | 37.85 | — | — | 12.75 | 8.45 | 8.45 | — | 23.0 |
| NaOH | — | — | — | — | — | — | — | — | — | 5.80 | 6.50 |
| Total | 1,000.00 | 1,000.00 | 1,000.00 | 1,000.00 | 1,000.00 | 1,000.00 | 1,000.00 | 1,000.00 | 1,000.00 | 1,000.00 | 1,000.00 |
| pH | 4.00 | 4.01 | 4.01 | 4.01 | 4.00 | 4.03 | 4.01 | 4.03 | 4.03 | 4.01 | 4.00 |
| Results | | | | No sign of scumming or any other abnormalities were found on the first 3,000 printed sheets. | | | | | | Signs of scumming were found using a manifying glass on the first several printed sheets. They ceased to appear on the tenth printed sheet. No signs of scumming were detected on the subsequent 2,990 printed sheets. | |

The numerical values given in the table (except pH) are in grams.

TABLE 2

| Components | Example 12 | Example 13 |
|---|---|---|
| Water | 864.87 | 849.06 |
| Phytic acid (50%) | 100.00 | 100.00 |
| P-toluenesulfonic acid | — | 15.00 |
| Adipic acid | 5.00 | 5.00 |
| Maleic acid | 10.00 | 10.00 |
| Ethylenediamine (98%) | 11.43 | 20.94 |
| Propylenediamine | 8.70 | — |

TABLE 2-continued

| Components | Example 12 | Example 13 |
|---|---|---|
| Total | 1,000.00 | 1,000.00 |
| pH | 4.00 | 4.00 |
| Results | No signs of scumming or other abnormalities were detected on the first 3,000 printed sheets. | |

The numerical values given in the table (except pH) are in grams.

TABLE 3

| Components | Example 14 | Example 15 | Example 16 | Example 17 | Example 18 | Example 19 | Example 20 |
|---|---|---|---|---|---|---|---|
| Water | 871.0 g | 875.4 g | 879.4 g | 873.9 g | 877.0 g | 874.0 g | 877.6 g |
| Phytic acid (50%) | 100.0 | 100.0 | 100.0 | 100.0 | 100.0 | 100.0 | 100.0 |
| Hexa methylene di-amine | 29.0 | 20.0 | 10.0 | 20.0 | 10.0 | 20.0 | 10.0 |
| NaOH | — | — | — | — | — | 5.8 | 12.4 |
| Ethylene di-amine | — | 4.6 | 10.6 | — | — | — | — |
| 1,2,Propylene di-amine | — | — | — | 6.1 | 13.0 | — | — |
| Total | 1,000.0 | 1,000.0 | 1,000.0 | 1,000.0 | 1,000.0 | 1,000.0 | 1,000.0 |
| pH | 4.00 | 4.00 | 4.00 | 4.00 | 4.00 | 4.00 | 4.00 |
| Results | | No signs of scumming or other abnormalities were found on the first 3,000 printed sheets. | | | | Signs of scumming were found using a manifying glass on the first several printed sheets. They ceased to appear on the tenth printed sheet. No signs of scumming were detected on the subsequent 3,000 printed sheets. | |

TABLE 4

| | Example No. | | | | | | | | | | | | | |
|---|---|---|---|---|---|---|---|---|---|---|---|---|---|---|
| Components | 21 | 22 | 23 | 24 | 25 | 26 | 27 | 28 | 29 | 30 | 31 | 32 | 33 | 34 |
| Water | 500 | 500 | 500 | 500 | 500 | 500 | 500 | 500 | 500 | 500 | 500 | 500 | 500 | 500 |
| Phytic acid (50%) | 60 | 60 | 60 | 60 | 60 | 60 | 60 | 60 | 60 | 60 | 60 | 60 | 60 | 60 |
| Ethylene di-amine | 9.5 | 9.5 | 9.7 | 9.6 | 9.4 | 9.5 | 9.5 | 9.5 | 9.5 | 9.6 | 9.4 | 9.6 | 9.5 | 9.6 |
| Na Benzoate | 0.5 | 0 | 0 | 0 | 0.5 | 0.5 | 0.5 | 0 | 0 | 0 | 0.5 | 0.5 | 0 | 0.5 |
| Na dihydroxyacetate | 0.2 | 0 | 0 | 0 | 0.2 | 0.2 | 0.2 | 0 | 0 | 0 | 0.2 | 0.2 | 0 | 0.2 |
| Butyl carbitol | 0 | 5 | 0 | 0 | 5 | 0 | 0 | 5 | 5 | 0 | 5 | 5 | 5 | 5 |
| Pullulan | 0 | 0 | 20 | 0 | 0 | 20 | 0 | 20 | 0 | 20 | 20 | 0 | 20 | 20 |
| Na p-toluenesulfonate | 0 | 0 | 0 | 24 | 0 | 0 | 24 | 0 | 24 | 24 | 0 | 24 | 24 | 24 |
| Results | | | | No signs of scumming or other abnormalities were found on the | | | | | | | | | | |

TABLE 4-continued

| Components | Example No. 21 | 22 | 23 | 24 | 25 | 26 | 27 | 28 | 29 | 30 | 31 | 32 | 33 | 34 |
|---|---|---|---|---|---|---|---|---|---|---|---|---|---|---|
| | first 3,000 printed sheets. | | | | | | | | | | | | | |

Quantities are in parts by weight.
Na benzoate and Na dihydroxyacetate are preservatives.
Butyl carbitol (DEG monobutyl ether) is a surface tension depressant to improve wettability.
Pullulan is a paste.
Na p-toluenesulfonate is a common additive for lipophobicating solutions containing phytic acid as a chelating agent.

TABLE 5

| Components | Comparative Experiment 1 | Comparative Experiment 2 | Comparative Experiment 3 | Comparative Experiment 4 | Comparative Experiment 5 | Comparative Experiment 6 |
|---|---|---|---|---|---|---|
| Water | 883.59 | 870.31 | 893.88 | 894.13 | 890.32 | 886.65 |
| Phytic acid (50%) | 100.00 | 100.00 | 100.00 | 100.00 | 100.00 | 100.00 |
| NaOH (98%) | 16.41 | — | — | — | — | — |
| KOH (85%) | — | 29.69 | — | — | — | — |
| Aqueous ammonia (28%) | — | — | 6.12 | — | — | — |
| Monoethanolamine | — | — | — | 5.87 | — | — |
| Diethanolamine | — | — | — | — | 9.68 | — |
| Triethanolamine | — | — | — | — | — | 13.35 |
| Total | 1,000.00 | 1,000.00 | 1,000.00 | 1,000.00 | 1,000.00 | 1,000.00 |
| pH | 4.04 | 4.03 | 4.03 | 4.05 | 4.05 | 4.05 |
| Results | Signs of scumming were detected on all the printed sheets. | | | | | |

The numerical values given in the table (except pH) are in grams.

What is claimed is:

1. In a method for offset printing with an electrophotographic plate, the improvement comprising using a lithophobicating solution comprising:

(a) an effective amount of phytic acid to prevent oily printing ink from sticking to nonimage areas of the surface of said electrophotographic plate, (b) an amount of a diamine, having the general formula $NH_2$—R—$NH_2$ wherein R is an alkyl or aryl group having from 2 to 8 carbon atoms, effective to adjust the pH of said lipophobicating solution to a value in the range of from about 3.0 to about 6.0, (c) at least about 60 mol% by weight, based on said phytic acid, of a mixture of at least two dicarboxylic acids selected from the group consisting of dicarboxyic acids represented by the formula HOOC—$(CH_2)_n$—COOH (wherein n is an integer in the range from 1 to 6) and phthalic acid, and (d) water.

2. The improved method for offset printing as defined in claim 1, wherein said diamine is at least one member selected from the group consisting of ethylenediamine, propylenediamine, trimethylenediamine, parapheynylenediamine, and hexamethylenediamine.

3. The improved method for offset printing as defined in claim 1, wherein the amount of said diamine in said lipophobicating solution is effective to adjust pH value of said lipophobicating solution to about 4.0.

4. The improved method for offset printing as defined in claim 1, wherein said lipophobicating solution further comprises at least one additive selected from the group consisting of a pH adjuster, a preservative, a surface tension depressant, a paste, and an aromatic sulfonic acid or salt thereof.

5. The improved method for offset printing as defined in claim 4, including a pH adjuster in an amount such that the ratio of said pH adjuster to said diamine will satisfy the requirement that at least 20 percent of the amount of said pH adjuster which otherwise would be required for the adjustment of the pH value of said lipophobicating solution in the absence of a diamine is replaced by an amount of said diamine possessing an equivalent pH adjusting capacity.

6. The improved method for offset printing as defined in claim 4, including a surface tension depressant selected from the group consisting of lower alcohol, ethers, ketones, and cellosolves.

7. The improved method for offset printing as defined in claim 4, including a paste selected from the group consisting of starch, starch derivatives, cellulose derivatives, sodium polyacrylate, gum arabic and pullulan.

8. The improved method for offset printing as defined in claim 4, including an aromatic sulfonic acid or salt thereof selected from the group consisting of benzene and toluene sulfonic acid and salts thereof.

9. The improved method for offset printing as defined in claim 4, including a sodium salt as a pH adjuster.

10. The improved method for offset printing as defined in claim 4, including a preservative selected from the group consisting of salicyclic acid, benzoic acid, and dehydroacetic acid.

11. The improved method for offset printing as defined in claim 1, wherein said lipophobicating solution consists essentially of:

(a) an effective amount of phytic acid to prevent oily printing ink from sticking to nonimage areas of the surface of said electrophotographic plate, (b) an amount of a diamine, having the general formula $NH_2$—R—$NH_2$ wherein R is an alkyl or aryl group having from 2 to 8 carbon atoms, effective to adjust the pH of said lipophobicating solution to a value in the range of from about 3.0 to 6.0 , (c) at least about 60 mol% by weight, based on said phytic acid, of a mixture of at least two dicarboxylic acids selected from the group consisting of dicarboxyic acids represented by the formula HOOC—$(CH_2)_n$—COOH (wherein n is an integer in the range from 1 to 6) and phthalic acid, and (d) water.

* * * * *